(12) United States Patent
Zlindra et al.

(10) Patent No.: US 9,062,797 B2
(45) Date of Patent: Jun. 23, 2015

(54) HIGH TEMPERATURE BUTTERFLY VALVE

(75) Inventors: Primoz Zlindra, Magstadt (DE); Timo Hufnagel, Weinstadt (DE); Mark Sealy, Warwickshire (DE)

(73) Assignee: Norgren GmbH, Alpen (DE)

( * ) Notice: Subject to any disclaimer, the term of this patent is extended or adjusted under 35 U.S.C. 154(b) by 196 days.

(21) Appl. No.: 13/821,313

(22) PCT Filed: Sep. 18, 2011

(86) PCT No.: PCT/EP2011/066162
§ 371 (c)(1),
(2), (4) Date: Mar. 7, 2013

(87) PCT Pub. No.: WO2012/038352
PCT Pub. Date: Mar. 29, 2012

(65) Prior Publication Data
US 2013/0168589 A1    Jul. 4, 2013

Related U.S. Application Data

(60) Provisional application No. 61/384,577, filed on Sep. 20, 2010.

(51) Int. Cl.
*F16K 1/22* (2006.01)
*F16K 49/00* (2006.01)
*F16K 1/226* (2006.01)
*F02D 9/10* (2006.01)
*F02D 11/10* (2006.01)
*F16K 27/02* (2006.01)

(52) U.S. Cl.
CPC ............. *F16K 49/005* (2013.01); *F16K 1/2263* (2013.01); *F02D 9/106* (2013.01); *F02D 11/10* (2013.01); *F16K 1/221* (2013.01); *F16K 1/222* (2013.01); *F16K 27/0218* (2013.01); *F16K 27/029* (2013.01); *F16K 1/226* (2013.01); *F16K 1/2268* (2013.01)

(58) Field of Classification Search
CPC ....... F16K 49/005; F16K 1/2268; F16K 1/22; F16K 1/222; F16K 1/221; F16K 27/0218; F02D 9/106
USPC .......................... 251/305–308, 214; 137/337
See application file for complete search history.

(56) References Cited

U.S. PATENT DOCUMENTS 2,505,809 A  *  5/1950  Svenson .......................... 60/328
3,642,024 A  *  2/1972  La Coste et al. .............. 137/340
6,273,058 B1    8/2001  Wagner
2005/0274367 A1 * 12/2005  Malone et al. ........... 123/568.18
2009/0165449 A1    7/2009  Christ et al.
2010/0270489 A1 * 10/2010  Mendoza et al. ............. 251/308

FOREIGN PATENT DOCUMENTS

CN           2276587 Y     3/1998
CN         201053508 Y     4/2008
(Continued)

*Primary Examiner* — Marina Tietjen
(74) *Attorney, Agent, or Firm* — The Ollila Law Group LLC

(57) ABSTRACT

A high-temperature butterfly valve (100) is provided. The high-temperature butterfly valve (100) includes a valve assembly (110), a valve actuator (123) configured to couple to the valve assembly (110), with the valve actuator (123) including an actuator shaft (126) configured to couple to a valve shaft (121) of the valve assembly (110), and a fluid cooling system (225) configured to flow a cooling fluid through at least a portion of the valve actuator (123).

20 Claims, 16 Drawing Sheets

(56) References Cited

FOREIGN PATENT DOCUMENTS

| DE | 102005042784 | A1 | 1/2007 |
|---|---|---|---|
| DE | 102007007393 | A1 | 8/2007 |
| FR | 2320458 | | 3/1977 |
| WO | 0162059 | A1 | 8/2001 |
| WO | 2007012402 | A1 | 1/2007 |
| WO | 2009094079 | A1 | 7/2009 |

\* cited by examiner

SECTION AA

SECTION AA

SECTION BB

HIGH TEMPERATURE BUTTERFLY VALVE

CROSS-REFERENCE TO RELATED APPLICATIONS

This is a National Stage entry of International Application No. PCT/EP2011/066162, with an international filing date of Sep. 18, 2011, entitled "High Temperature Butterfly Valve" which claims priority of U.S. provisional application 61/384,577, filed Sep. 20, 2010, entitled "Butterfly Valve".

BACKGROUND OF THE INVENTION

1. Field of the Invention

The invention is related to the field of butterfly valves, and more particularly, to a high-temperature butterfly valve.

2. Description of the Prior Art

Valves are used in a variety of applications, including in industrial environments, vehicles, buildings and structures, and so forth. A valve is used to regulate the flow of fluids, including liquids, gases, and mixtures thereof. The flow can include particulates in some environments.

Butterfly valves include a generally round flap that is rotated on a shaft, wherein the rotation can move the valve flap to extend across the valve bore, closing the valve, or rotate the valve to extend horizontally, aligned with the bore and opening the valve to fluid flow. The valve flap may be fully aligned with the flow in some embodiments, wherein the valve flap presents a minimal obstruction to the flow and the valve bore is substantially unobstructed. The valve shaft and valve flap can be rotated by any suitable means, including by mechanical linkages, by electromagnetic devices, and so forth.

Butterfly valves have many advantages. Butterfly valves are simple in design and simple to use. Butterfly valves can offer fast response times. Butterfly valves can offer minimal flow limits or obstructions when fully open. For these reasons, a butterfly valve is highly desirable for regulating flow in ducts.

Butterfly valves feature a minimum of moving parts. But more importantly, butterfly valves have no need for small clearances or tolerances in order to function properly.

An important advantage of butterfly valves is that they are well suited to use with hot fluids, such as hot gases. Butterfly valves are popular for use in engine exhaust systems, as the valve flap can be made to close reliably even in the presence of high temperatures. Further, the valve flap-to-valve-seat contact is simple and does not require high tolerances. Dimensional changes due to heating may not render a butterfly valve inoperable or inefficient. The valve will still operate even where the butterfly valve is subject to thermal expansion and contraction.

However, prior art butterfly valves have drawbacks. Use with high temperature fluids, such as hot exhaust gases, can cause damage. Hot pressurized gases can dry out lubricants and damage bearings. Hot pressurized gases can degrade seal materials, such as rubber or plastics. Thermal expansion can increase friction and binding or cause leakage due to thermal expansion or contraction.

ASPECTS OF THE INVENTION

In some aspects of the invention, a high-temperature butterfly valve comprises:

a valve assembly;

a valve actuator configured to couple to the valve assembly, with the valve actuator including an actuator shaft configured to couple to a valve shaft of the valve assembly; and a fluid cooling system configured to flow a cooling fluid through at least a portion of the valve actuator.

Preferably, the valve including a thermal conductor ring positioned between and contacted by the valve assembly and by the valve actuator, wherein the thermal conductor ring conducts heat from the valve assembly to the valve actuator.

Preferably, the valve including a thermal conductor ring positioned between and contacted by the valve shaft of the valve assembly and by an actuator inner mating portion of the valve actuator, wherein the thermal conductor ring conducts heat from the valve shaft to the actuator inner mating portion and wherein the actuator inner mating portion of the valve actuator is in communication with the fluid cooling system.

Preferably, the valve including a thermal insulator gasket positioned between and contacted by the valve assembly and the valve actuator, wherein the thermal insulator gasket blocks heat transfer from the valve assembly to the valve actuator.

Preferably, the valve including a thermal insulator gasket positioned between and contacted by a valve outer mating portion of the valve assembly and an actuator outer mating portion of the valve actuator, wherein the thermal insulator gasket substantially blocks heat transfer from the valve outer mating portion of the valve assembly to the valve actuator and allows heat transfer from the valve outer mating portion to the actuator inner mating portion via the thermal conductor ring.

Preferably, the valve shaft and the actuator shaft are correspondingly splined, wherein the hollow splined portion allows thermal expansion and contraction of the valve shaft without affecting the coupling between the actuator shaft and the valve shaft.

Preferably, the valve shaft includes a hollow portion that receives at least a portion of the actuator shaft, wherein the hollow portion of the valve shaft reduces a heat transfer from the valve shaft to the actuator shaft.

Preferably, the valve assembly comprises a valve body including a valve bore passing through the valve body, and a shaft bore, the valve shaft located in the shaft bore and extending substantially across the valve bore, and a valve flap affixed to the valve shaft and configured to be rotated by the valve shaft, with the valve flap being configured to rotate between a closed orientation blocking the valve bore and an open orientation, with the valve flap being affixed on an upstream valve bore portion side of the valve shaft and offset from a center of the valve shaft, wherein incoming fluid presses the valve flap against the valve shaft.

In some aspects of the invention, a high-temperature butterfly valve comprises:

a valve assembly;

a valve actuator configured to couple to the valve assembly, with the valve actuator including an actuator shaft configured to couple to a valve shaft of the valve assembly;

a thermal conductor ring positioned between and contacted by the valve assembly and the valve actuator, wherein the thermal conductor ring conducts heat from the valve assembly to the valve actuator;

a thermal insulator gasket positioned between and contacted by the valve assembly and the valve actuator, wherein the thermal insulator gasket blocks heat transfer from the valve assembly to the valve actuator; and a fluid cooling system configured to flow a cooling fluid through at least a portion of the valve actuator, wherein the fluid cooling system conducts away heat received in the valve actuator.

Preferably, the valve shaft and the actuator shaft are correspondingly splined, wherein the hollow splined portion allows thermal expansion and contraction of the valve shaft without affecting the coupling between the actuator shaft and the valve shaft.

Preferably, the valve shaft includes a hollow portion that receives at least a portion of the actuator shaft, wherein the hollow portion of the valve shaft reduces a heat transfer from the valve shaft to the actuator shaft.

Preferably, the valve assembly comprises a valve body including a valve bore passing through the valve body, and a shaft bore, the valve shaft located in the shaft bore and extending substantially across the valve bore, and a valve flap affixed to the valve shaft and configured to be rotated by the valve shaft, with the valve flap being configured to rotate between a closed orientation blocking the valve bore and an open orientation, with the valve flap being affixed on an upstream valve bore portion side of the valve shaft and offset from a center of the valve shaft, wherein incoming fluid presses the valve flap against the valve shaft.

Preferably, the fluid cooling system comprises a substantially liquid cooling system.

Preferably, the fluid cooling system comprises a substantially gas cooling system.

In some aspects of the invention, a high-temperature butterfly valve comprises:

a valve assembly;

a valve actuator configured to couple to the valve assembly, with the valve actuator including an actuator shaft configured to couple to a valve shaft of the valve assembly; and a hollow portion formed in the valve shaft and configured to receive at least a portion of the actuator shaft, wherein the hollow portion of the valve shaft reduces a heat transfer from the valve shaft to the actuator shaft, with the valve shaft and the actuator shaft being correspondingly splined, wherein the hollow splined portion allows thermal expansion and contraction of the valve shaft without affecting the coupling between the actuator shaft and the valve shaft; and a fluid cooling system configured to flow a cooling fluid through at least a portion of the valve actuator.

Preferably, the valve including a thermal conductor ring positioned between and contacted by the valve assembly and by the valve actuator, wherein the thermal conductor ring conducts heat from the valve assembly to the valve actuator.

Preferably, the valve including a thermal conductor ring positioned between and contacted by the valve shaft of the valve assembly and by an actuator inner mating portion of the valve actuator, wherein the thermal conductor ring conducts heat from the valve shaft to the actuator inner mating portion and wherein the actuator inner mating portion of the valve actuator is in communication with the fluid cooling system.

Preferably, the valve including a thermal insulator gasket positioned between and contacted by the valve assembly and the valve actuator, wherein the thermal insulator gasket blocks heat transfer from the valve assembly to the valve actuator.

Preferably, the valve including a thermal insulator gasket positioned between and contacted by a valve outer mating portion of the valve assembly and an actuator outer mating portion of the valve actuator, wherein the thermal insulator gasket substantially blocks heat transfer from the valve outer mating portion of the valve assembly to the valve actuator and allows heat transfer from the valve outer mating portion to the actuator inner mating portion via the thermal conductor ring.

Preferably, the valve assembly comprises a valve body including a valve bore passing through the valve body, and a shaft bore, the valve shaft located in the shaft bore and extending substantially across the valve bore, and a valve flap affixed to the valve shaft and configured to be rotated by the valve shaft, with the valve flap being configured to rotate between a closed orientation blocking the valve bore and an open orientation, with the valve flap being affixed on an upstream valve bore portion side of the valve shaft and offset from a center of the valve shaft, wherein incoming fluid presses the valve flap against the valve shaft.

Preferably, the fluid cooling system comprises a substantially liquid cooling system.

Preferably, the fluid cooling system comprises a substantially gas cooling system.

BRIEF DESCRIPTION OF THE DRAWINGS

The same reference number represents the same element on all drawings. It should be understood that the drawings are not necessarily to scale.

DETAILED DESCRIPTION OF THE INVENTION

FIGS. 1-16 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
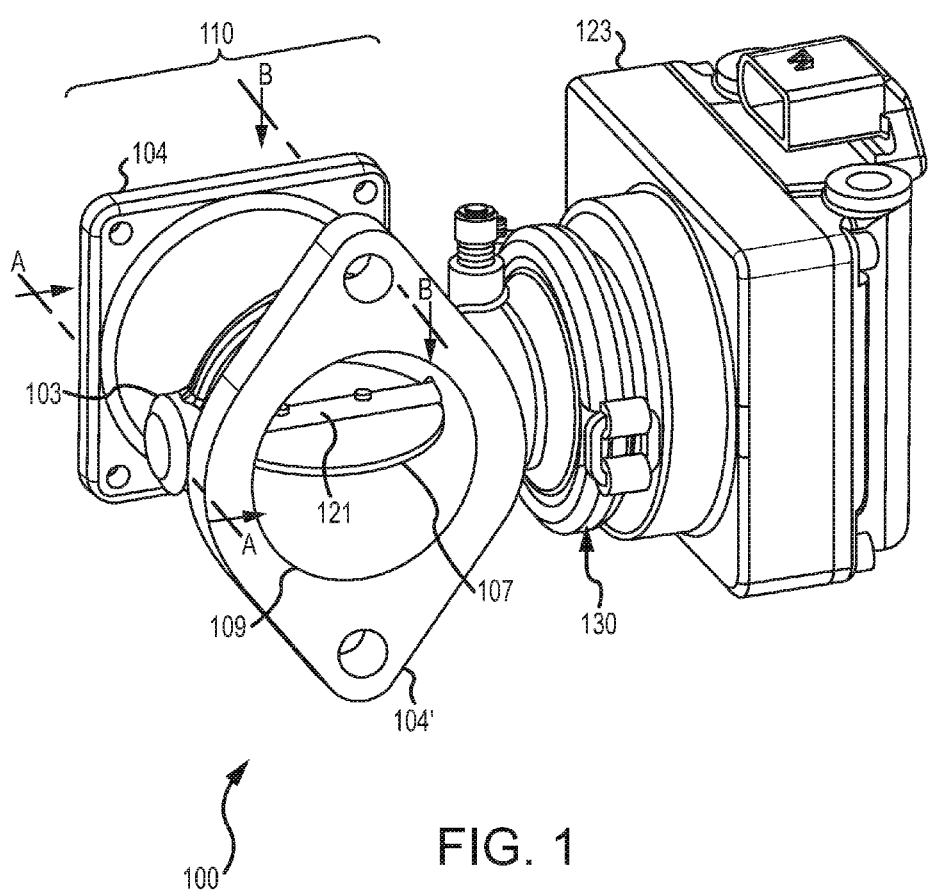
FIG. 1 shows a two-part butterfly valve according to the invention.

FIG. 1 shows a butterfly valve 100 according to the invention. The butterfly valve 100 includes a valve assembly 110 and an actuator 123 coupled to the valve assembly 110. The valve assembly 110 includes a valve body 103, a valve bore 109 extending through the valve body 103, and a valve flap 107 configured to rotate within the valve bore 109 on a valve shaft 121. The valve body 103 can include flanges 104 and 104' and/or other attachment features that enable the butterfly valve 100 to be assembled to other components or devices. The butterfly valve may be used for regulating fluids of varying temperatures, such as where the fluid may cause thermal expansion and thermal contraction of the butterfly valve.

The actuator 123 comprises a device that is capable of rotating the valve shaft 121 and therefore rotating the valve flap 107. The actuator 123 includes an actuator shaft 126 or other rotational member that couples to the valve shaft 121. The actuator shaft 126 can comprise a splined shaft, keyed shaft, shaped shaft, or any shaft configuration that transfers rotational movement (see FIG. 4). The actuator 123 can comprise any manner of rotational actuator, including mechanical, electrical/magnetic, pneumatic, hydraulic, or other actuator devices. The actuator 123 can be affixed to the valve assembly 110 in any manner. For example, the actuator 123 can be removably affixed to the valve assembly 110 by a clamp 130 (see FIG. 2 and the accompanying discussion below).

Figure 13:
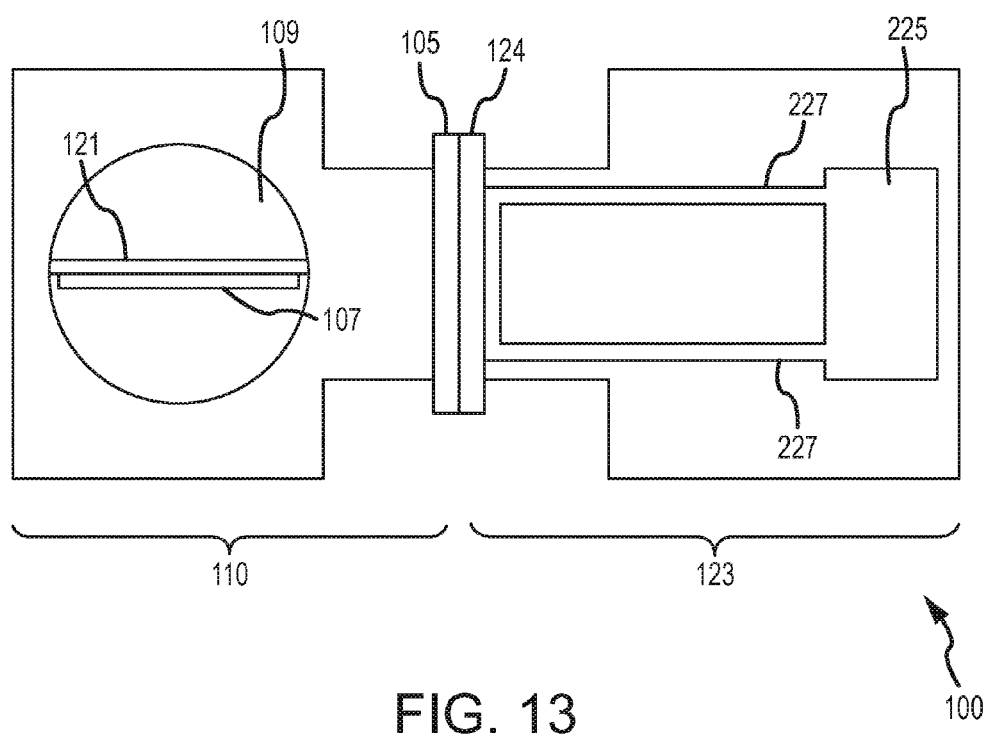
FIG. 13 shows a high-temperature butterfly valve according to the invention.

In some embodiments, the actuator 123 can include a fluid cooling system 225 (see FIG. 13 and the accompanying discussion). The fluid cooling system 225 can include a cooling liquid or cooling gas that is used to draw heat away from the actuator 123. The fluid cooling system 225 can transfer heat out of the actuator 123. The fluid cooling system 225 can be static or can including circulation of a cooling liquid or cooling gas.

Where the valve assembly 110 is used for regulating hot liquids or hot gases, most heat transfer will occur at the junction between the two components. Such heat transfer is generally not desired. Consequently, the butterfly valve 100 includes features that minimize heat transfer and/or conducts transferred heat through certain components. As a result, heat transfer to the actuator 123 is minimized and controlled, wherein the operational life of the actuator 123 is improved.

Significant heat transfer into the actuator 123 may cause problems. The heat transfer may dry out or damage bearings. The heat transfer may increase electrical resistance and increase power consumption. The heat transfer may affect actuation speed and/or actuation response times. The heat transfer may cause components to change size and/or change tolerances due to thermal expansion and thermal contraction.

Figure 2:
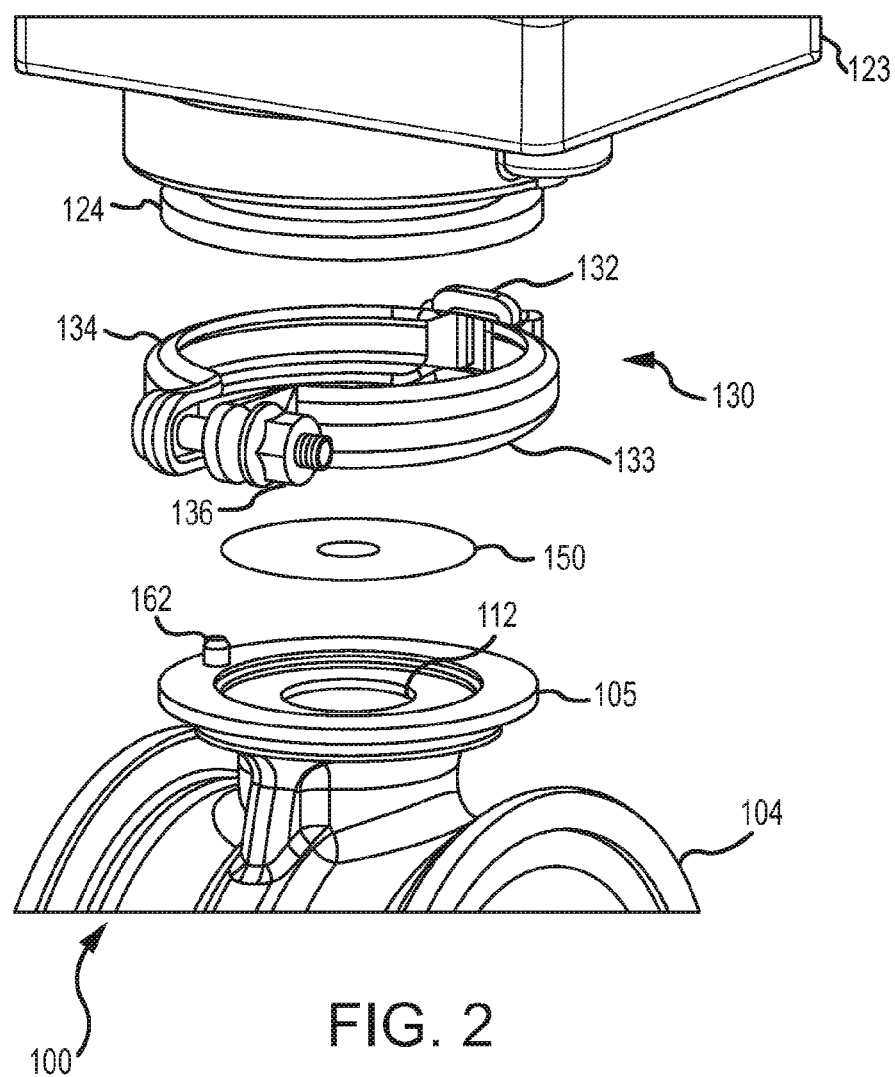
FIG. 2 shows detail of the butterfly valve according to the invention.

FIG. 2 shows detail of the butterfly valve 100 according to the invention. This figure shows a valve flange 105 and a corresponding shaft bore 112, an actuator flange 124, and a spacer (or washer) 150 that is received and trapped between the two main components.

The spacer 150 can seal between the two components. To that end, the spacer 150 can be at least partially resilient and/or partially compressible. The spacer 150 can be of a thickness wherein the valve flange 105 and the actuator flange 124 must at least partially compress the spacer 150 before the two flanges come into contact. Alternatively, the joint can be vented or may not need to be fluid tight. It should be understood that alternatively the spacer 150 can be replaced by a thermal insulator gasket 157 and/or a thermal conductor ring 156 (see FIG. 3, for example, and the accompanying discussion).

The spacer 150 can comprise a friction element that at least partially prevents rotation of the two valve components when clamped between the two flanges. The friction characteristic can be provided by the resilient/compressible nature of the spacer 150, for example.

The figure shows detail of an embodiment of the clamp 130. In this embodiment, the clamp 130 comprises first and second clamp portions 133 and 134. In another embodiment, the clamp 130 can comprise a single piece with one split, wherein only a single tightening device 136 is needed. A joiner mechanism 132 joins the two clamp portions at one point and a tightening device 136 joins the other ends. The joiner mechanism 132 can comprise a mechanical arrangement, including a disengageable mechanism, such as the buckle and loops shown. However, other mechanisms can be employed. For example, the clamp 130 can be constructed with two tightening devices 136.

The tightening device 136 can be manipulated to constrict the clamp 130, as previously discussed. Therefore the tightening device 136 can bring together ends of the first and second clamp portions 133 and 134. In the embodiment shown, the tightening device 136 comprises a threaded fastener. The threaded fastener can comprise a nut and bolt, but can comprise other configurations, such as a threaded screw that engages an aperture (or threaded aperture) in a clamp portion end.

The internal shape of the clamp 130 acts to force together the two flanges. The internal shape can therefore be substantially rectangular, with perpendicular sidewalls. Alternatively, the sidewalls can be angled, curved, or other desired shapes.

The figure further shows an alignment feature 162 extending from the valve flange 105. The alignment feature 162 can be of any shape or size. The alignment feature 162 in some embodiments comprises a dowel. The alignment feature 162 engages a substantially corresponding aperture, notch, depression, et cetera (not shown) in the actuation flange 124. The alignment feature 162 can therefore align the valve actuator 123 with the valve body 103 during assembly. Advantageously, the alignment feature 162 in some embodiments may assist in aligning the actuator shaft 126 with the valve flap 107 of the valve mechanism 103. Further, the alignment feature 162 can prevent rotation of the valve actuator 123 with respect to the valve body 103.

Figure 3:
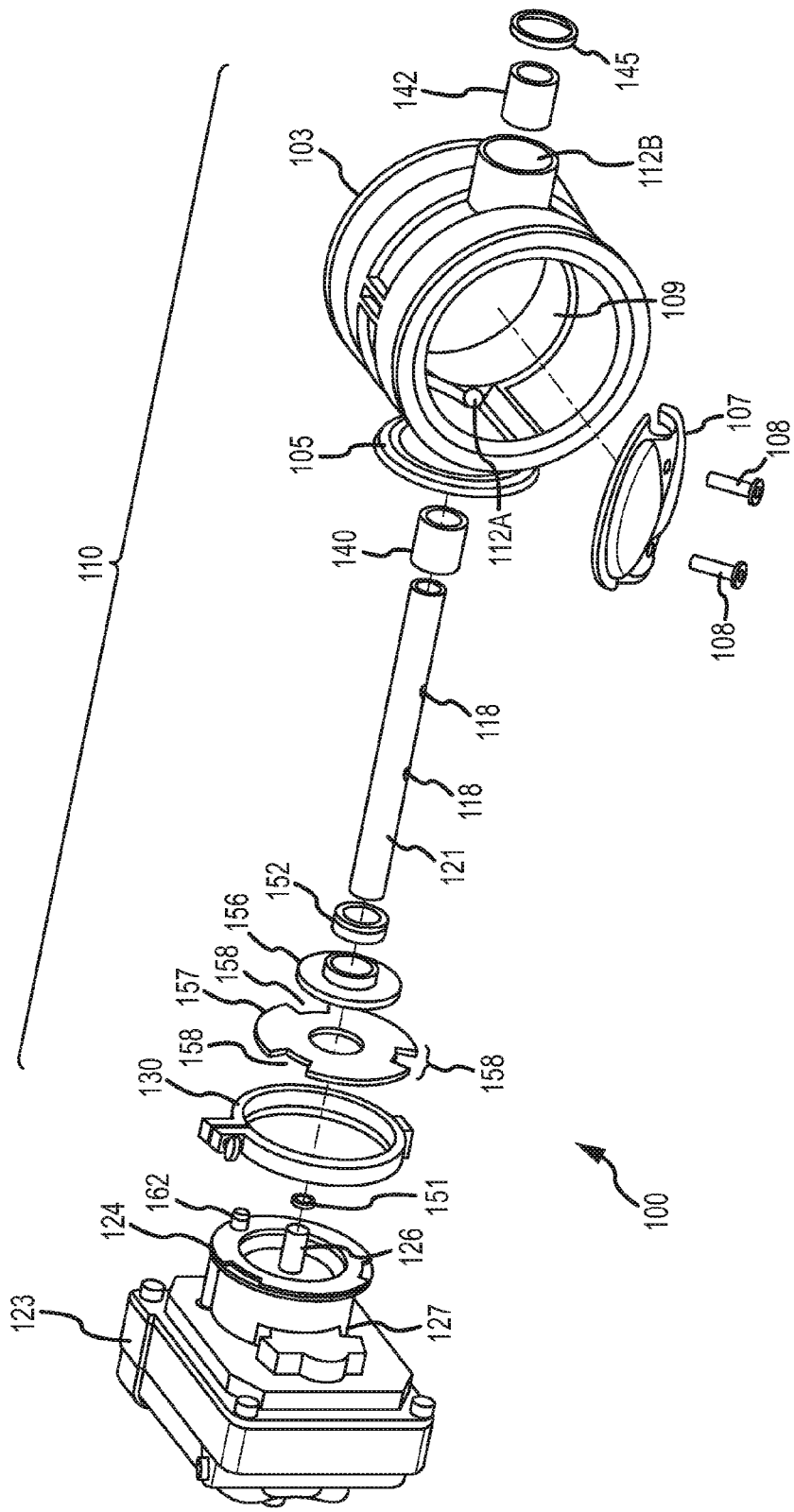
FIG. 3 is an exploded view of the butterfly valve according to the invention.

FIG. 3 is an exploded view of the butterfly valve 100 according to the invention. As discussed above, the actuator 123 includes an actuator shaft 126 and an alignment feature 162. The valve assembly 110 includes the valve body 103, the valve bore 109 passing through the valve body 103, and the shaft bore 112 extending across the valve body 103 and substantially transverse to the valve bore 109. The shaft bore 112 is interrupted by the valve bore 109 and comprises shaft bore portions 112A and 112B. The valve shaft 121 is located within the shaft bores 112A and 112B and may rotate within the valve body 103.

The valve shaft 121 includes one or more flap fastener bores 118 that receive one or more corresponding flap fasteners 108. The valve flap 107 is affixed to the valve shaft 121 by one or more flap fasteners 108. The one or more flap fasteners 108 can comprise any suitable fasteners. The one or more flap fasteners 108 can permanently or removably affix the valve flap 107 to the valve shaft 121.

The non-actuator end of the valve shaft 121 receives a shaft bearing or bushing 142 and an end seal 145. The shaft bearing 142 fits over the valve shaft 121 and allows the valve shaft 121 to rotate in the shaft bore portion 112B. The end seal 145 can comprise a plug that is press fit or otherwise removably or permanently affixed in the end of the shaft bore 112B, thereby substantially sealing the end of the shaft bore 112B. Neither the valve shaft 121, nor gas or liquid in the valve assembly 110, can escape from the shaft bore portion 112B as a result of installation of the end seal 145.

The actuator end of the valve shaft 121 receives a shaft bearing 140, at least one compression ring 152, a thermal conductor ring 156, a thermal insulator gasket 157, and a lip seal 159. The shaft bearing 140 fits over the valve shaft 121 and is received in the shaft bore 112A, similar to the shaft bearing 142. The valve shaft 121 can rotate in the shaft bearing 140. The shaft bearing 140, when assembled to the valve shaft 121 and the valve body 103, will substantially abut the thermal conductor ring 156. The shaft bearings 140 and 142 may absorb any axial loads exerted by the valve flap 107 and the valve shaft 121.

The actuator shaft 126 may be splined (see FIG. 14), keyed, or otherwise shaped so that a hollow end of the valve shaft 121 fits over the actuator shaft 126 and rotational movement is transferred therebetween. The actuator shaft 126 may be held in place in relation to the valve shaft 121 by the clamp 130. Alternatively, the actuator shaft 126 may include a snap ring or other retainer device.

The snap ring 151 fits into a groove or channel on the protruding actuator shaft 126. The snap ring 151 also fits into a snap ring groove 128 formed inside a hollow portion 129A of the valve shaft 121 (see FIG. 6 and the accompanying text). Consequently, the actuator shaft 126 and the valve shaft 121 are held together in some embodiments. As a result, axial loads on the valve shaft 121 are transmitted into the actuator 123. Such axial loads may arise from fluid pressure and/or fluid flow, including from forces acting on the valve flap 107. Because the bushings 140 and 142 do not have to absorb or control axial shaft loads, the bushings 140 and 142 will offer less rotational resistance in some embodiments.

The thermal insulator gasket 157 is located between the valve assembly 110 and the actuator 123. The thermal insulator gasket 157 seals between the valve assembly 110 and the actuator 123. The thermal insulator gasket 157 is held in place when the clamp 130 is applied to the valve body flange 105 and the actuator flange 124. In addition, the thermal insulator gasket 157 may be formed of a material that has a low heat transfer property. As a result, the thermal insulator gasket 157 reduces or prevents heat transfer between the valve body 103 and the actuator housing 127. Further, the thermal insulator gasket 157 prevents fluid from escaping at the junction of the actuator 123 and the valve assembly 110.

Figure 6:
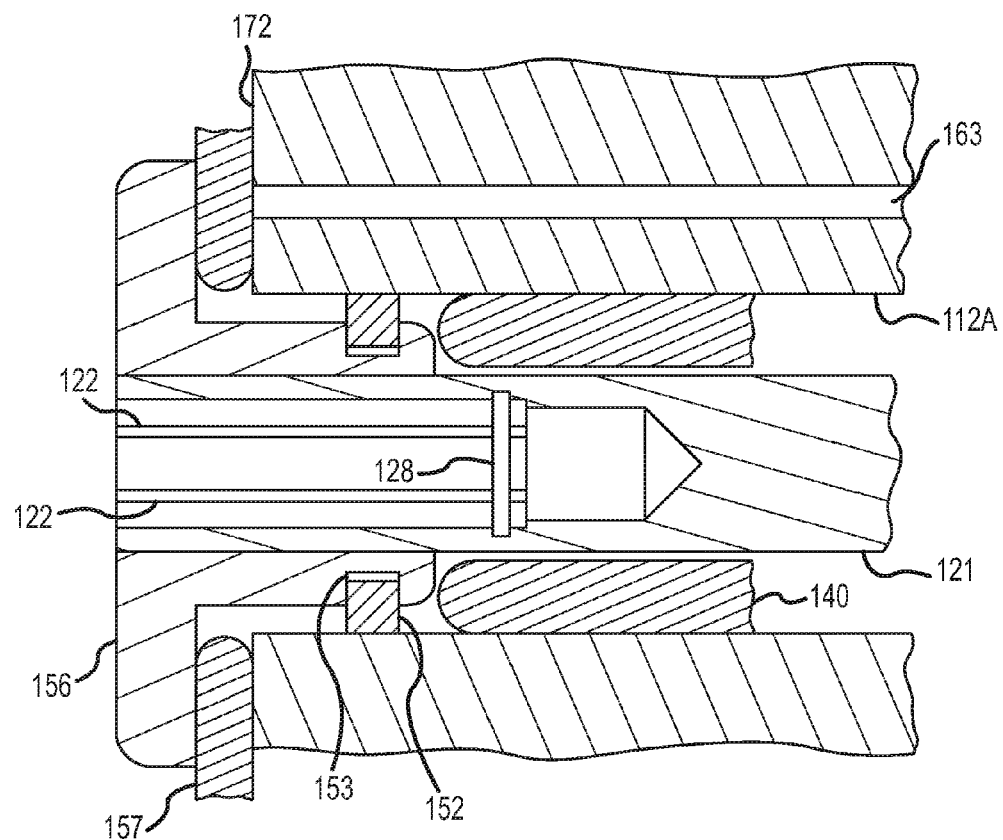
FIG. 6 is a cross-section of an actuator end of a valve shaft, showing detail of a thermal conductor ring and a compression ring.

The compression ring 152 fits onto the thermal conductor ring 156 (see FIG. 6, for example). The compression ring 152 may fit into a corresponding ring groove 153 formed in the thermal conductor ring 156. The compression ring 152 may be removably mounted to the thermal conductor ring 156. The compression ring 152 may be formed or machined to have a relatively tight tolerance with the ring groove 153. Further, the compression ring 152 may be at least partially flexible and compressible, wherein the compression ring 152 must be compressed somewhat in order for the compression ring 152 and the thermal conductor ring 156 to be inserted into the actuator-side shaft bore 112A. As a result, the compression ring 152 substantially seals the thermal conductor ring 156 to the inner surface of the actuator-side shaft bore 112A. Consequently, the thermal conductor ring 156 can conduct heat between the valve assembly 110 and the actuator 123, but fluid within the valve assembly 110 cannot leak to the actuator 123 or escape at the junction of the valve assembly 110 and the actuator 123.

The compression ring 152 comprises a metallic ring in some embodiments. Alternatively, the compression ring 152 can be formed from high temperature plastic or any material that is not degraded by high temperatures and that can be compressed at least somewhat.

The thermal conductor ring 156 is located between the valve assembly 110 and the actuator 123. The thermal conductor ring 156 in some embodiments is configured and sized to fit tightly over the end of the valve shaft 121 so that no fluid can travel between the valve shaft 121 and the thermal conductor ring 156. The thermal conductor ring 156 may be formed of a material having a relatively high thermal transfer characteristic, so that heat present in the end of the valve shaft 121 may be conducted to the actuator housing 127. This may draw some heat away from the actuator shaft 126.

Figure 4:
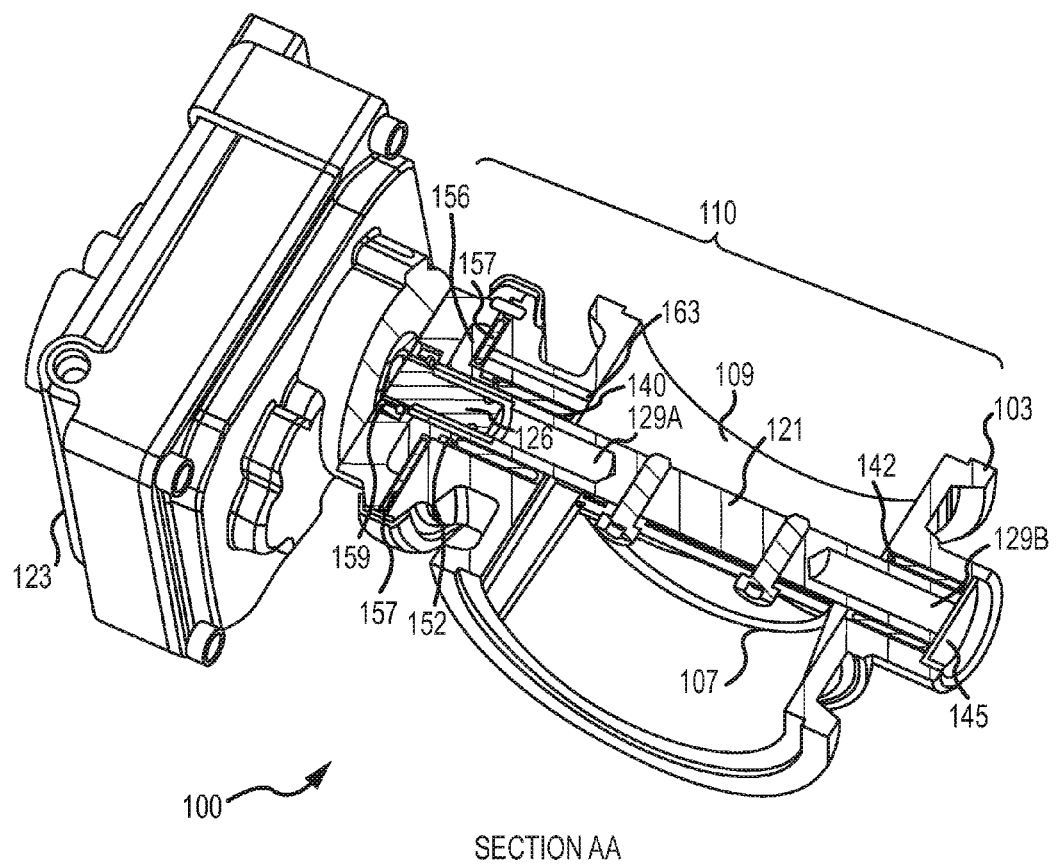
FIGS. 4-5 are section views that show detail of the junction between a valve assembly and actuator according to the invention.
Figure 5:
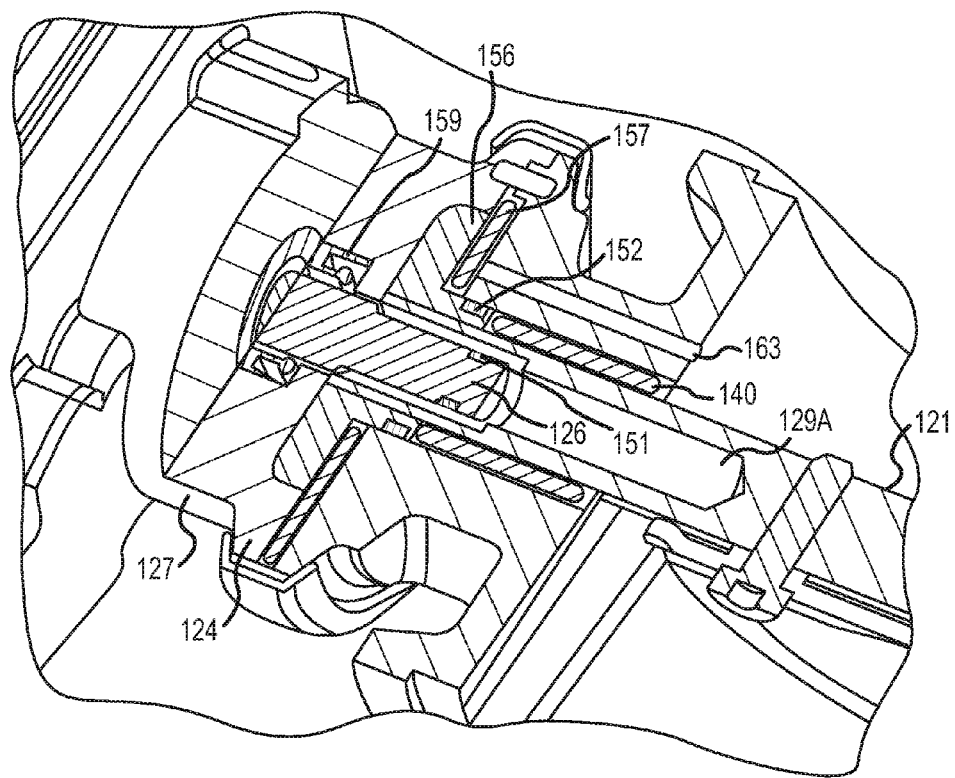

FIGS. 4-5 are section views that show detail of the junction between the valve assembly 110 and the actuator 123 according to the invention. The end of the valve shaft 121 includes a hollow portion 129A. The hollow portion 129A corresponds to and fits over the actuator shaft 126. The hollow portion 129A in some embodiments comprises a hollow splined portion 129A. The hollow splined portion 129A fits over a correspondingly splined portion of the actuator shaft 126, wherein the splines transmit the rotation of the actuator shaft 123 to the valve shaft 121. The hollow portion 129A additionally presents a much lower heat transfer capacity, wherein less heat is able to be conducted by the valve shaft 121 to the actuator 123 due to the hollow portion 129A.

The lip seal 159 is configured to fit over the actuator shaft 126 and substantially seal the actuator shaft 126 to an inner surface of the actuator housing 127. One lip of the lip seal 159 (i.e., the inner lip) will sealingly contact the actuator shaft 126, while the other lip (i.e., the outer lip) will sealingly contact the inner surface of the actuator housing 127 (see FIG. 10 and the accompanying discussion below). The lip seal 159 is configured to seal around the actuator shaft 126 and to prevent fluids from the valve bore 109 from reaching the interior of the actuator 123. The lip seal 159 is held in place within the actuator housing 127.

The lip seal 159 is preferably formed of a resilient material, such as rubber or a rubber compound, and may be degraded by excessive heat. For this reason, it is desirable to minimize the amount of heat absorbed by the actuator housing 127, such as by the portion of the actuator housing 127 that is adjacent to the valve assembly 110.

FIG. 6 is a cross-section of the actuator end of the valve shaft 121, showing detail of the thermal conductor ring 156 and the compression ring 152. It should be understood that the shaft bearing 140 is included to hold the valve shaft 121 in place and allow the valve shaft 121 to freely rotate. Further, or alternatively, the valve shaft 121 can include a snap ring groove 128 that receives the snap ring 151. The snap ring 1561 may rest in the snap ring groove 128 and may engage a corresponding groove or other feature in the actuator shaft 126.

However, the shaft bearing 140 may not seal between the valve shaft 121 and the shaft bore 112A. The valve shaft is often a leakage path. When the valve is closed or nearly closed, there is high pressure on the upstream side of the valve 109U and low pressure on the downstream side 109D. The resulting large pressure differential causes the upstream pressurized fluid to travel into the area around the valve shaft 121 in order to skirt the valve flap 107. This is especially true where the valve flap 107 is not on one side or the other of the valve shaft 121, so that the valve shaft 121 is in fluid communication with both the upstream and downstream sides of the valve bore 109.

At least one compression ring 152 is mounted to the thermal conductor ring 156 and is located within the actuator-side shaft bore 112A. The compression ring 152 fits partially into and extends partially out of a corresponding ring groove 153 in the thermal conductor ring 156 in some embodiments. The compression ring 152 substantially seals the thermal conductor ring 156 to the actuator-side shaft bore 112A.

The compression ring 152 is designed to be under at least some compression and therefore substantially contacts and presses outwardly against the inner surface of the shaft bore 112A. In addition, the tolerances may be designed so that the compression ring 152 substantially contacts the sides of the ring groove 153, wherein pressurized fluid cannot pass underneath the compression ring 152. As is shown in the figure, there may be a clearance space below the compression ring 152. Consequently, little or no pressurized fluid will be able to pass around the valve shaft 121 and the thermal conductor ring 156.

Figure 7:
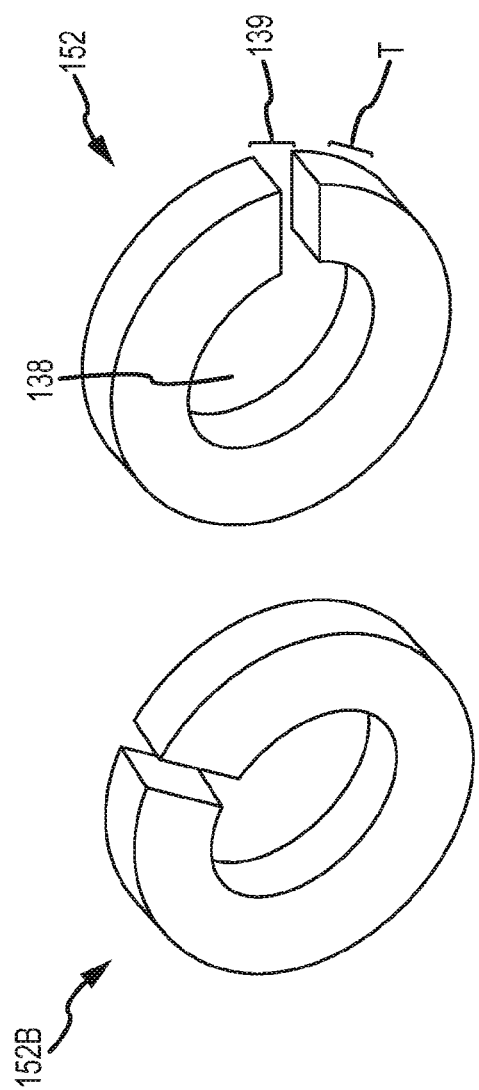
FIG. 7 shows the compression ring according to the invention.

FIG. 7 shows the compression ring 152 according to the invention. The compression ring 152 can comprise a substantially annular shape and a predetermined thickness T. The compression ring 152 includes an aperture 138 in the substantially planar, annular body. However, it should be understood that the compression ring 152 can have various cross-sectional shapes and is not limited to the substantially rectangular cross-sectional shape shown in the figure.

The compression ring 152 in this embodiment includes a gap 139. The gap 139 may be sized to allow a predetermined amount of compression.

The compression ring 152 may be formed of any suitable material. The compression ring 152 is at least partially resilient and therefore at least partially compressible. In some embodiments, the compression ring 152 may be at least partially metallic in composition. In some embodiments, the compression ring 152 may be at least partially plastic in composition. However, it should be understood that any suitable material may be used for the compression ring 152.

Figure 8:
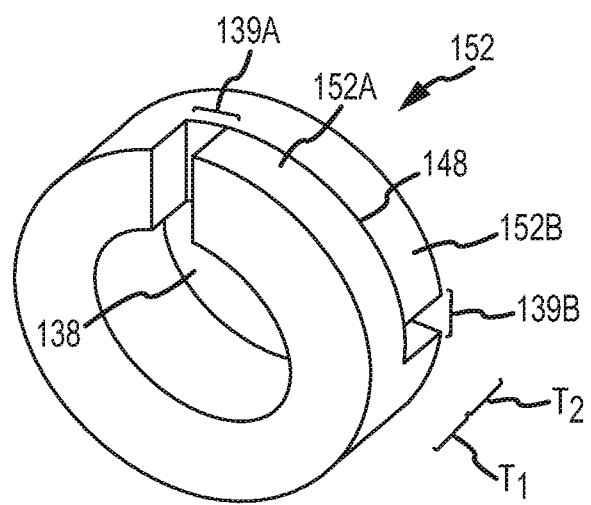
FIG. 8 shows the compression ring according to the invention.

FIG. 8 shows the compression ring 152 according to the invention. In this embodiment, the compression ring 152 comprises a substantially planar, annular body with the aperture 138 therethrough. In this embodiment, however, the body is divided into two portions, a first split portion 152A and a second split portion 152B, with the two split portions having the predetermined thicknesses $T_1$ and $T_2$. The thicknesses $T_1$ and $T_2$ may be the same or different. A split 148 exists between the two split portions 152A and 152B, with each split portion ending in gaps 139A and 139B. This design allows the compression ring 152 to be compressed, but with even better sealing properties.

The first gap 139A and the second gap 139B may be of any desired size, as discussed above, wherein the first and second gaps 139A and 139B allow the compression ring 152 to be compressed. The first gap 139A is offset from the second gap 139B by a predetermined circumferential (or angular) distance. As a result, there is no clear, unobstructed gap for fluid to escape through. Further, if fluid pressure exists on the front surface of the compression ring 152, then the front split portion 152A may be pressed against the rear split portion 152B, wherein the split 148 becomes compressed and negligible in size.

Figure 9:
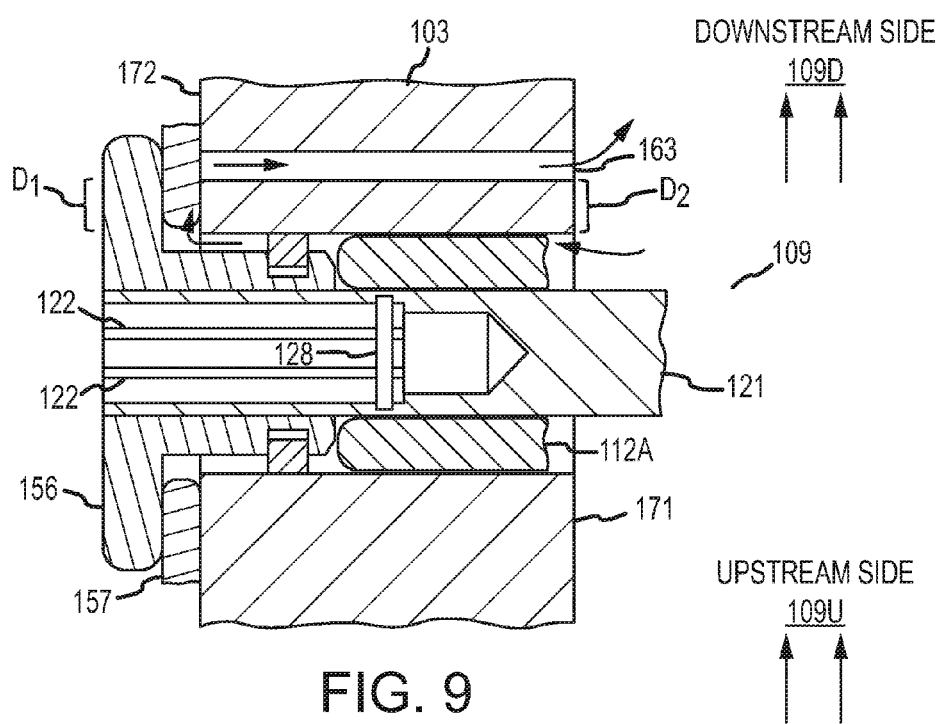
FIG. 9 shows detail of a leakage return conduit according to the invention.

FIG. 9 shows detail of a leakage return conduit 163 according to the invention. The butterfly valve may be used for regulating fluids of varying pressures, including where fluid pressure may cause leakage around a valve shaft bore 112. The leakage return conduit 163 does not allow fluid to escape externally. The leakage return conduit 163 extends through the valve body 103 from a valve inner mating portion 172 to the interior valve bore surface 171. The leakage return conduit 163 is configured to return any leakage fluid present at the valve inner mating portion 172 to a downstream valve bore portion 109D. However, it should be understood that the leakage return conduit 163 does not allow leakage fluids to escape the butterfly valve 100, as commonly occurs in the prior art. As a consequence, the leakage return conduit 163 is therefore not an access port for moisture, dirt, or other foreign matter to get inside the butterfly valve 100. The leakage return conduit 163 is spaced a predetermined first distance $D_1$ from the actuator-side shaft bore 112A at the valve inner mating portion 172. The leakage return conduit 163 is spaced a predetermined second distance $D_2$ from the actuator-side shaft bore 112A at the interior valve bore surface 171. The leakage return conduit 163 may be substantially parallel to the actuator-side shaft bore 112A. Alternatively, the leakage return conduit 163 may be non-parallel to the actuator-side shaft bore 112A.

The leakage return conduit 163 may be of a predetermined cross-sectional area. The cross-sectional area may be chosen according to an expected leakage volume or leakage rate. The cross-sectional area may be chosen to accommodate an average expected leakage, a minimum expected leakage, a maximum expected leakage, or other desired value.

Some leakage may occur past the shaft bearing 140. Most leakage will not escape past the thermal conductor ring 156 in combination with the compression ring 152. However, a smaller level of leakage may occur past the thermal conductor ring 156 in combination with the compression ring 152. This leakage will travel between the valve inner mating portion 172 of the valve body 103 and the thermal insulator gasket 157 and consequently enter the leakage return conduit 163. This is aided by the pressure differential between the upstream side 109U of the valve bore 109 with respect to the downstream side 109D. This positive pressure differential may create a venturi effect in the leakage return conduit 163, drawing any fluid leakage into the leakage return conduit 163 and therefore to the downstream side 109D of the valve bore 109.

Figure 10:
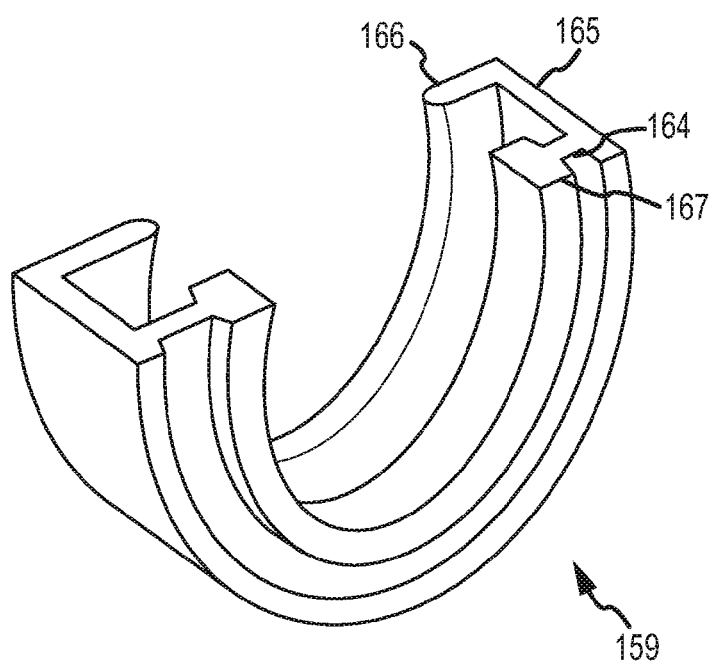
FIG. 10 shows detail of a lip seal according to the invention.

FIG. 10 shows detail of the lip seal 159 according to the invention. The lip seal 159 is positioned over the actuator shaft 126 of the valve actuator 123 and abuts the valve actuator 123. The lip seal 159 may abut and contact the actuator housing 127 (see FIG. 5). The lip seal 159 is configured to prevent any fluid in the actuator-side shaft bore 112A from passing into the valve actuator 123 around the actuator shaft 126.

The lip seal 159 comprises a first annular seal portion 164 extending radially inward, a second annular seal portion 166 extending radially inward and substantially parallel to the first annular seal portion 164, and a web portion 165 extending between and joining the second annular seal portion 166 to the first annular seal portion 164. The first annular seal portion 164 may include an enlarged portion 167, as shown. The enlarged portion 167 can be substantially rectangular in shape, as shown. Alternatively, the enlarged portion 167 can be diamond shaped, circular or elliptical, regular or irregular, or any other suitable shape. It should be understood that the second annular seal portion 166 may also include an enlarged portion, if desired.

The first annular seal portion 164 is configured to sealingly contact the actuator shaft 126, even when the actuator shaft 126 is rotating. The second annular seal portion 166 is configured to sealingly contact the actuator housing 127.

The lip seal 159 may be formed of an at least partially flexible material. The lip seal 159 may be formed of an at least partially resilient material. The lip seal 159 may be formed of an at least partially compressible material.

Figure 11:
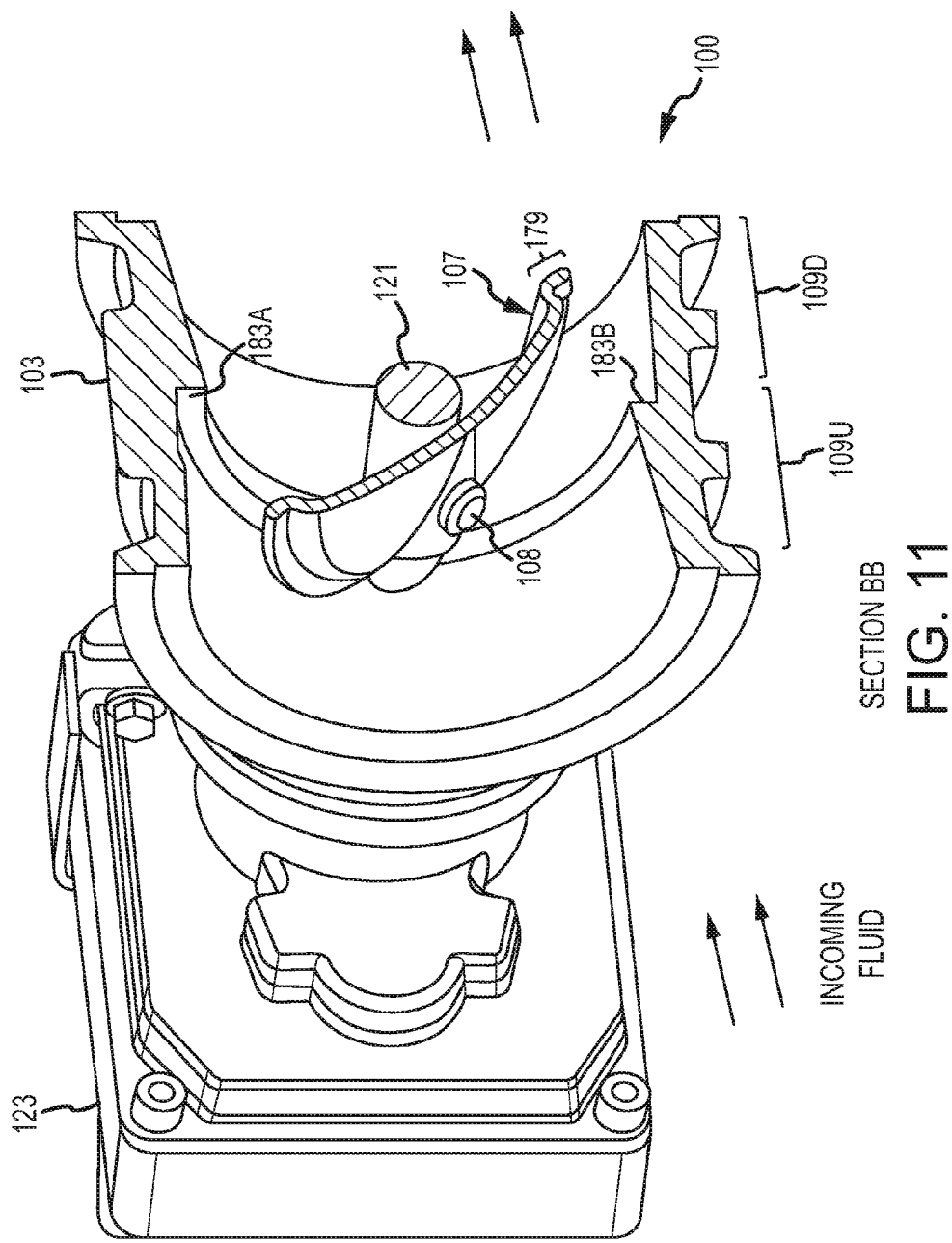
FIG. 11 is a section view through the valve assembly of the butterfly valve.

FIG. 11 is a section view through the valve assembly 110 of the butterfly valve 100. This view shows the valve flap 107 mounted to the valve shaft 121 by the one or more flap fasteners 108. The figure also illustrates the valve bore 109.

The valve bore 109 includes bore shoulders 183 that are configured to be substantially sealingly contacted by the valve flap 107 when the valve flap 107 is in a closed position.

In the embodiment shown, the valve bore 109 comprises an upstream valve bore portion 109U and a downstream valve bore portion 109D, wherein the upstream valve bore portion 109U and the downstream valve bore portion 109D are substantially separated by the valve flap 107 when the valve flap 107 is in a closed position. It should be understood that the terms upstream and downstream are used in context of the fluid entering from the left side in the figure. Fluid could flow in the opposite direction through the valve bore 109, but some of the advantages would then not be realized in the butterfly valve 100.

The bore shoulders 183 in some embodiments can comprise an upper bore shoulder 183A and a lower bore shoulder 183B. The upper bore shoulder 183A and the lower bore shoulder 183B may not necessarily form a single continuous surface. In the embodiment shown, the valve shaft 121 interrupts the upper bore shoulder 183A and the lower bore shoulder 183B. The upper bore shoulder 183A can face the upstream valve bore portion 109U, while the lower bore shoulder 183B can face the downstream valve bore portion 109D.

The valve flap 107 includes a face seal 179. The face seal 179 in the embodiment shown can comprise a substantially planar annular surface that is configured to substantially seal against the bore shoulders 183. Likewise, the bore shoulders 183 can be substantially planar and annular in shape, although the bore shoulders 183 can comprise two separate shoulder sections. The face seal 179 can be configured to substantially lap over the bore shoulders 183 and sealingly contact the bore shoulders 183, but yet while allowing the valve flap 107 to thermally expand and contract. As a result, at least a portion of the flap seal 179 will fit to and substantially lap over at least a portion of the bore shoulders 183 when the valve flap 107 is rotated to the fully closed position. The flap seal 179 can be formed with sufficient radial clearance to avoid the sides of the valve bore 109.

By not sealing against the wall of the valve bore 109, as is done in the prior art, the face seal feature of the present invention avoids thermal expansion problems. Expansion and contraction of the material of the valve flap 107 does not result in binding against the valve bore 109. Expansion and contraction of the material of the valve flap 107 therefore does not place additional loads on the valve shaft seals, bushings, or bearings. Further, in the prior art, as the bushings or bearings wear over the life of the valve, the peripheral prior art seal is negatively affected. Advantageously, the face seal 179 herein described is not negatively affected by worn or loose bushings or bearings.

Even where the valve flap 107 exhibits thermal expansion, the design avoids clearance problems while yet maintaining a significant and satisfactory seal contact area. The flap seal 179 and the bore shoulders 183 allow sealing contact without the need for close tolerances. Further, fluid pressure on the upstream valve bore portion 109U will serve to increase the closing pressure of the valve flap 107 on the upper bore shoulder 183A, offsetting the opening pressure exerted by the fluid with regard to the lower bore shoulder 183B.

Both the upstream valve bore portion 109U and the downstream valve bore portion 109D are tapered in some embodiments. The tapered upstream valve bore portion 109U and the tapered downstream valve bore portion 109D may provide ramped steps in the valve bore 109, as shown. The ramped steps may provide a substantially constant flow area through the length of the valve body 103. The ramped steps may reduce drag as the fluid flows through the valve bore 109, with the ramped steps smoothly conduct fluid toward and away from the bore shoulders 183.

The valve flap 107 is offset on the valve shaft 121 in some embodiments. This is unlike the prior art, where the prior art butterfly valve flap is typically centered on the valve shaft. The offset is on the side of the upstream valve bore portion 109U. A benefit of this mounting arrangement is that the incoming fluid is physically isolated from the valve shaft 121. Consequently, the fluid pressure will press the valve flap 107 against the valve shaft 121. The one or more flap fasteners 108 will only hold the valve flap 107 in position, and will not need to retain the valve flap 107 against a fluid pressure.

Another benefit of this mounting arrangement is that the incoming fluid is thermally isolated from the valve shaft 121. This greatly reduces heat transfer from the fluid to the valve shaft 121. As a result, the bearings, seals, and actuator mechanism of the butterfly valve 100 will have a longer operational life. Less heat transfer will cause less damage to soft and easily temperature-damaged seal materials, such as rubber, for example. Less heat transfer will cause less drying out of lubricants. Less heat transfer will cause less thermal expansion and contraction and therefore less thermal warping, less wear, and less binding. Less heat transfer will cause less electrical resistance.

Figure 12:
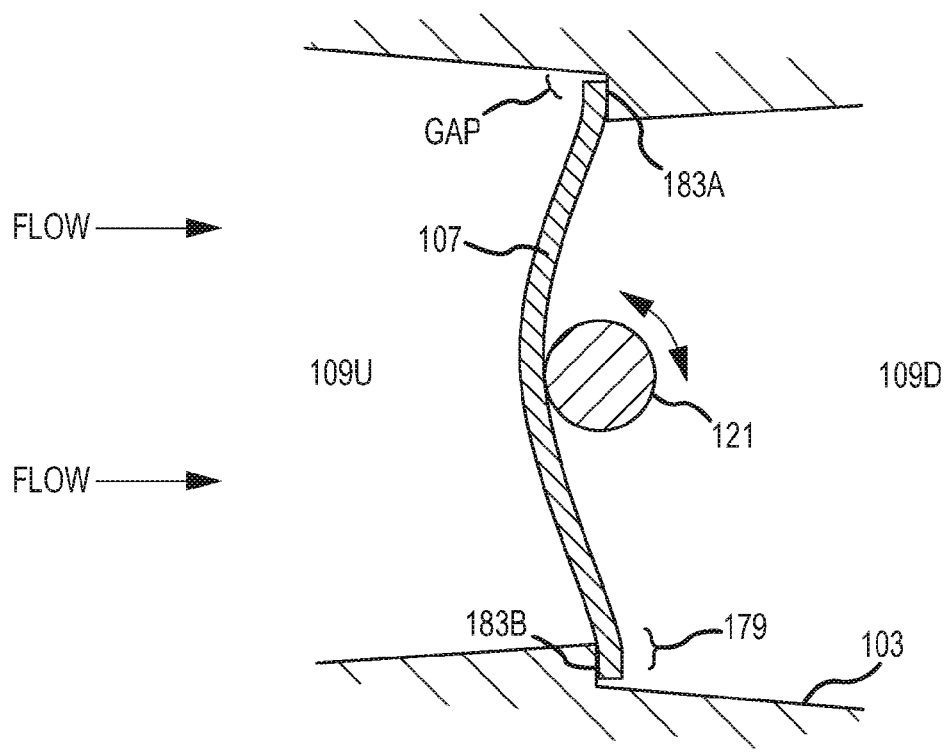
FIG. 12 is a section view of the valve flap in a closed position.

FIG. 12 is a section view of the valve flap 107 in a closed position. The valve flap 107 is affixed to the upstream valve bore portion side of the valve shaft 121, on the side of the upstream valve bore portion 109U of the valve bore 109 with respect to the valve shaft 121. The incoming fluid (see arrows) presses the valve flap 107 against the valve shaft 121.

In the closed position, the flap seal 179 of the valve flap 107 substantially sealingly contacts the one or more bore shoulders 183 of the valve bore 109. In some embodiments, the flap seal 179 comprises a substantially planar annular surface. Similarly, the one or more bore shoulders 183 in some embodiments comprises a substantially planar annular surface, wherein the flap seal 179 is configured to fit substantially flatly against the one or more bore shoulders 183.

In the embodiment shown, the valve flap 107 is substantially transverse to the valve bore 109 when the valve flap 107 is in the closed position. However, the closed position of the valve flap 107 may be determined by the positions of the bore shoulders 183, and does not have to be strictly transverse to the fluid flow.

It can be seen from the figure that a gap may exist between the outer circumferential edge of the flap seal 179 and the valve bore 109. This gap allows thermal expansion and thermal contraction of the valve flap 107 (and of the valve bore 109). This gap does not have to be of a small tolerance. Any changes in the size of the gap due to thermal expansion or contraction will not affect the seal between the flap seal 179 and the one or more bore shoulders 183.

The valve flap 107 is preferably formed of a material having a low heat transfer characteristic. As a consequence, the valve flap 107 will transfer relatively little heat from the fluid to the valve shaft 121, including when the valve flap 107 is in the closed position. In some embodiments, one or both of the flap seal 179 and the one or more bore shoulders 183 are formed of metal. The valve flap 107 alternatively may include a sealing material on the flap seal 179, but the sealing material will need to be able to withstand high temperatures without degrading.

It can be seen from this figure that the valve flap 107 physically shields the valve shaft 121 from the upstream pressure of the fluid. The valve flap 107 physically shields the valve shaft 121 from the backpressure created when the valve is closed or nearly closed. In addition, the valve flap 107 thermally shields the valve shaft from the incoming fluid in the upstream valve bore portion 109U, and especially when the valve flap 107 is in the closed position.

FIG. 13 shows a high-temperature butterfly valve 100 according to the invention. The high-temperature butterfly valve 100 includes the valve assembly 110 according to any of the embodiments herein. The high-temperature butterfly valve 100 includes a valve actuator 123 that includes a fluid cooling system 225 according to some embodiments of the invention. The fluid cooling system 225 includes one or more cooling ducts 227 that extend to, and are in thermal communication with, the actuator flange 124. The actuator flange 124 is designed to mate to the valve flange 105 of the valve assembly 110. The fluid cooling system 225 can provide cooling fluid to at least part of the actuator flange 124 and can receive cooling fluid back. The fluid cooling system 225 can circulate cooling fluid to the actuator flange 124 in order to remove heat from the actuator flange 124, and nearby portions of the valve actuator 123. Further, the fluid cooling system 225 can include ducts in other parts of the valve actuator 123, wherein various portions of the valve actuator 123 can be thermally regulated.

The fluid cooling system 225 can be contained within the valve actuator 123. Alternatively, portions or components of the fluid cooling system 225 can extend outside valve actuator 123. For example, the fluid cooling system 225 can include a heat exchanger device or devices that are located outside the valve actuator 123, wherein the cooling fluid is circulated through the valve actuator 123.

The cooling fluid can comprise a liquid in some embodiments. The cooling fluid can comprise a gas in some embodiments. Alternatively, the cooling fluid can comprise portions of liquid and gas, as desired.

Figure 14:
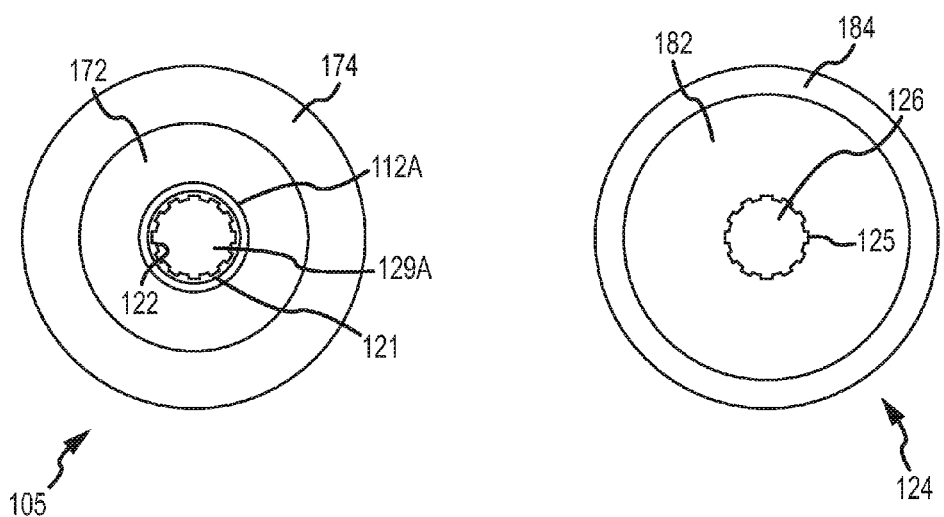
FIG. 14 shows the mating regions of the valve assembly and the valve actuator.

FIG. 14 shows the mating regions of the valve assembly 110 and the valve actuator 123, comprising the valve flange 105 (the left image in the figure) and the actuator flange 124 (the right image). The valve flange 105 includes a valve outer mating portion 174 and a valve inner mating portion 172. The actuator-side shaft bore 112A may be at substantially the center of the valve flange 105, with the actuator-side shaft bore 112A receiving the valve shaft 121. This figure shows the splines 122 in the hollow portion 129A of the valve shaft 121 and substantially corresponding splines 125 on the actuator shaft 126.

The valve outer mating portion 174 and the valve inner mating portion 172 can comprise substantially annular, planar faces in some embodiments. The valve inner mating portion 172 may be recessed with respect to the valve outer mating portion 174, as shown, or may be substantially co-planar or may extend outward past the valve outer mating region 174. The valve outer mating portion 174 and the valve inner mating portion 172 may be substantially concentric in some embodiments. The relative sizes of the valve outer mating portion 174 and the valve inner mating portion 172 are not necessarily to scale and do not necessarily represent desired or actual proportions.

Similarly, the valve actuator 123 includes an actuator inner mating portion 182 and an actuator outer mating portion 184. The actuator shaft 126 may be substantially at the center of the actuator flange 124 and configured to engage the valve shaft 121 of the valve assembly 110. The actuator inner mating portion 182 and the actuator outer mating portion 184 can comprise substantially annular, planar faces in some embodiments. The actuator inner mating portion 182 may be recessed with respect to the actuator outer mating portion 184, as shown, or may be substantially co-planar or may extend outward past the actuator outer mating region 184. The actuator inner mating portion 182 and the actuator outer mating portion 184 may be substantially concentric in some embodiments. The relative sizes of the actuator inner mating portion 182 and the actuator outer mating portion 184 are not necessarily to scale and do not necessarily represent desired or actual proportions.

In the high-temperature butterfly valve 100 embodiments, at least a subregion of the actuator inner mating portion 182 can be in thermal contact with the fluid cooling system 225. Alternatively, according to the design and cooling needs of the valve actuator 123, the entire actuator inner mating portion 182 can be in thermal contact with the fluid cooling system 225. Consequently, the fluid cooling system 225 can remove heat from the actuator inner mating portion 182, such as heat that is received from the valve assembly 110.

Figure 15:
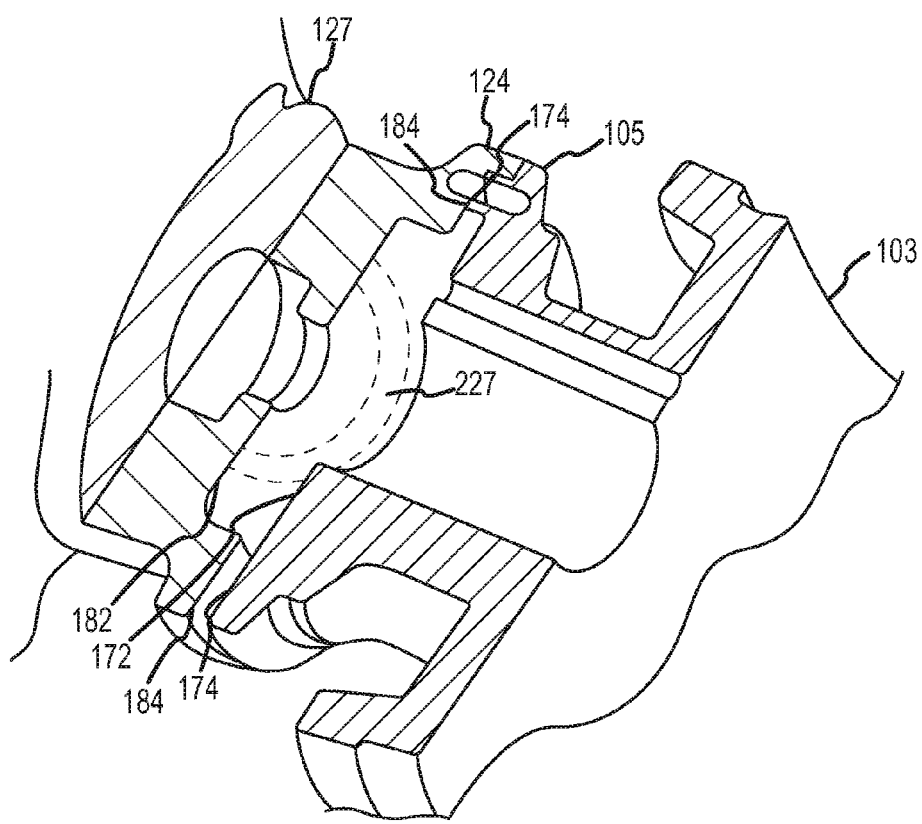
FIG. 15 shows the mating regions of the valve assembly and the valve actuator.

FIG. 15 shows the mating regions of the valve assembly 110 and the valve actuator 123. When the valve actuator 123 is assembled to the valve assembly 110, the valve outer mating portion 174 of the valve assembly 110 may at least partially contact the actuator outer mating portion 184 of the valve actuator 123. The valve outer mating portion 174 may not necessarily match the actuator outer mating portion 184 in size or shape. The resulting minimal contact area between the valve flange 105 and the actuator flange 124 advantageously minimizes heat transfer between the two components, as both the valve body 103 and the actuator housing 127 may be formed of metal.

Referring again to FIG. 5, a space between the valve assembly 110 and the valve actuator 123 receives the thermal conductor ring 156 and the thermal insulator gasket 157. The thermal insulator gasket 157 in some embodiments may partially overlap the thermal conductor ring 156. As a result, the thermal conductor ring 156 may transfer heat from the end of the valve shaft 121 to the valve actuator 123, including to a region of the fluid cooling system 225. Advantageously, much less heat will be transferred from the valve shaft 121 to the actuator shaft 126 and internal actuator components, such as motor windings.

The thermal conductor ring 156 is positioned between and is contacted by the valve assembly 110 and by the valve actuator 123, wherein the thermal conductor ring 156 conducts heat from the valve assembly 110 to the valve actuator 123. The thermal conductor ring 156 in some embodiments is positioned between and is contacted by the valve shaft 121 of the valve assembly 110 and by an actuator inner mating portion 182 of the valve actuator 123, wherein the thermal conductor ring 156 conducts heat from the valve shaft 121 to the actuator inner mating portion 182 and wherein the actuator inner mating portion 182 of the valve actuator 123 is in communication with the fluid cooling system 225. The actuator inner mating portion 182 in some embodiments is in thermal communication with a cooling duct 227 or duct surface (see dashed lines) of the fluid cooling system 225.

At least a portion of the thermal insulator gasket 157 is clamped between the valve assembly 110 and the valve actuator 123 in some embodiments. The thermal insulator gasket 157 is consequently positioned between and contacted by the valve assembly 110 and the valve actuator 123, wherein the thermal insulator gasket 157 blocks heat transfer from the valve assembly 110 to the valve actuator 123.

In some embodiments, the thermal insulator gasket 157 is positioned between and contacted by a valve outer mating portion 174 of the valve assembly 110 and an actuator outer mating portion 184 of the valve actuator 123, wherein the thermal insulator gasket 157 substantially blocks heat transfer from the valve outer mating portion 174 of the valve assembly 110 to the valve actuator 123 and minimizes heat transfer between the valve body 103 and the actuator housing 127. In addition, the thermal insulator gasket 157 may substantially seal the valve body 103 to the actuator housing 127.

However, the thermal insulator gasket 157 allows heat transfer from the valve assembly 110 to the valve actuator 123 through the thermal conductor ring 156. In some embodiments, the thermal insulator gasket 157 allows heat transfer from the valve outer mating portion 174 to the actuator inner mating portion 182 via the thermal conductor ring 156.

Figure 16:
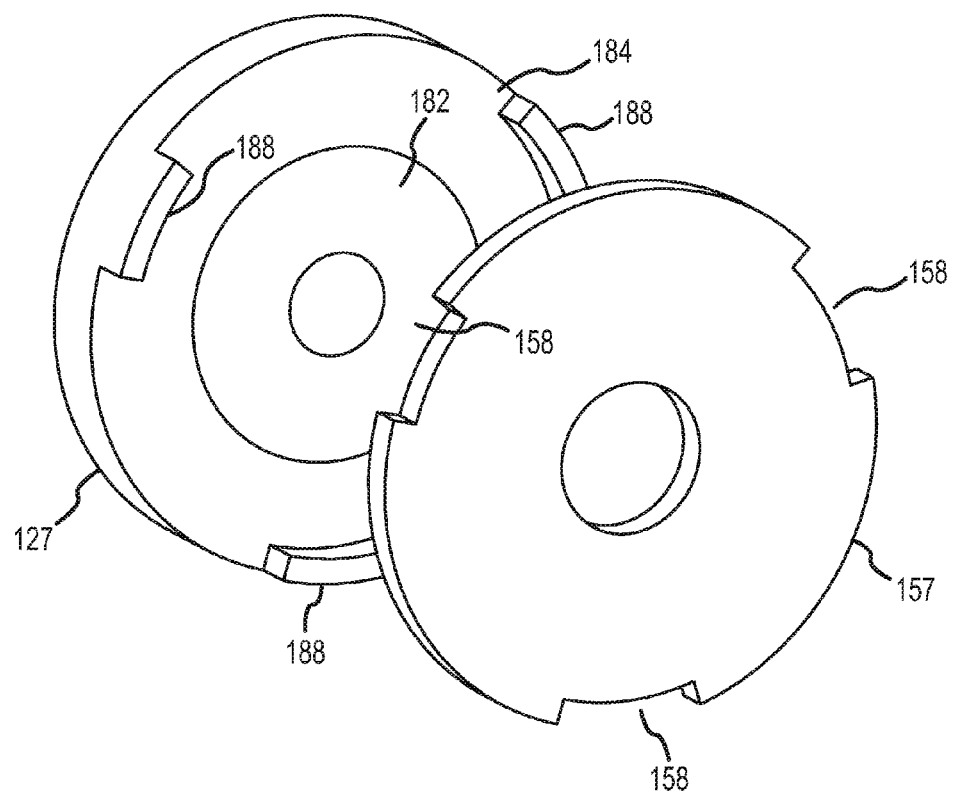
FIG. 16 shows detail of the mating regions of the valve assembly and the valve actuator.

FIG. 16 shows detail of the mating regions of the valve assembly 110 and the valve actuator 123. This figure shows one or more interlock protrusions 188 formed on and extending from the outward face of the actuator flange 124. Corresponding depressions are formed in the valve flange 105, wherein the valve actuator 123 and the valve assembly 110 rotationally and positionally interlock when assembled together. The one or more interlock protrusions 188 (and the corresponding interlock depressions) can comprise one or more interlock features of any desired shape and/or size. In addition, the one or more interlock protrusions 188 pass through corresponding cut-outs 158 in the thermal insulator gasket 157. Advantageously, the one or more interlock protrusions 188 may be kept small, thereby minimizing metal-to-metal contact. The minimization of metal-to-metal contact between the actuator 123 and the valve assembly 110 will minimize the heat transfer therebetween.

We claim:

1. A high-temperature butterfly valve (100), comprising:
   a valve assembly (110);
   a valve actuator (123) configured to couple to the valve assembly (110), with the valve actuator (123) including an actuator shaft (126) configured to couple to a valve shaft (121) of the valve assembly (110);
   a fluid cooling system (225) configured to flow a cooling fluid through at least a portion of the valve actuator (123); and
   a thermal conductor ring (156) positioned between and contacted by the valve assembly (110) and by the valve actuator (123), wherein the thermal conductor ring (156) conducts heat from the valve assembly (110) to the valve actuator (123).

2. The high-temperature butterfly valve (100) of claim 1, with the valve (100) including a thermal conductor ring (156) positioned between and contacted by the valve shaft (121) of the valve assembly (110) and by an actuator inner mating portion (182) of the valve actuator (123), wherein the thermal conductor ring (156) conducts heat from the valve shaft (121) to the actuator inner mating portion (182) and wherein the actuator inner mating portion (182) of the valve actuator (123) is in communication with the fluid cooling system (225).

3. The high-temperature butterfly valve (100) of claim 1, with the valve (100) including a thermal insulator gasket (157) positioned between and contacted by the valve assembly (110) and the valve actuator (123), wherein the thermal insulator gasket (157) blocks heat transfer from the valve assembly (110) to the valve actuator (123).

4. The high-temperature butterfly valve (100) of claim 1, with the valve (100) including a thermal insulator gasket (157) positioned between and contacted by a valve outer mating portion (174) of the valve assembly (110) and an actuator outer mating portion (184) of the valve actuator (123), wherein the thermal insulator gasket (157) substantially blocks heat transfer from the valve outer mating portion (174) of the valve assembly (110) to the valve actuator (123) and allows heat transfer from the valve outer mating portion (174) to the actuator inner mating portion (182) via the thermal conductor ring (156).

5. The high-temperature butterfly valve (100) of claim 1, with the valve shaft (121) and the actuator shaft (126) being correspondingly splined, wherein a hollow splined portion (129A) allows thermal expansion and contraction of the valve shaft (121) without affecting the coupling between the actuator shaft (126) and the valve shaft (121).

6. The high-temperature butterfly valve (100) of claim 1, with the valve shaft (121) including a hollow portion (129A) that receives at least a portion of the actuator shaft (126), wherein the hollow portion (129A) of the valve shaft (121) reduces a heat transfer from the valve shaft (121) to the actuator shaft (126).

7. The high-temperature butterfly valve (100) of claim 1, with the valve assembly (110) comprising:
   a valve body (103) including a valve bore (109) passing through the valve body (103), and a shaft bore (112);
   the valve shaft (121) located in the shaft bore (112) and extending substantially across the valve bore (109); and
   a valve flap (107) affixed to the valve shaft (121) and configured to be rotated by the valve shaft (121), with the valve flap (107) being configured to rotate between a closed orientation blocking the valve bore (109) and an open orientation, with the valve flap (107) being affixed on an upstream valve bore portion side of the valve shaft (121) and offset from a center of the valve shaft (121), wherein incoming fluid presses the valve flap (107) against the valve shaft (121).

8. A high-temperature butterfly valve (100), comprising:
   a valve assembly (110);
   a valve actuator (123) configured to couple to the valve assembly (110), with the valve actuator (123) including an actuator shaft (126) configured to couple to a valve shaft (121) of the valve assembly (110);
   a thermal conductor ring (156) positioned between and contacted by the valve assembly (110) and the valve actuator (123), wherein the thermal conductor ring (156) conducts heat from the valve assembly (110) to the valve actuator (123);
   a thermal insulator gasket (157) positioned between and contacted by the valve assembly (110) and the valve actuator (123), wherein the thermal insulator gasket (157) blocks heat transfer from the valve assembly (110) to the valve actuator (123); and
   a fluid cooling system (225) configured to flow a cooling fluid through at least a portion of the valve actuator (123), wherein the fluid cooling system (225) conducts away heat received in the valve actuator (123).

9. The high-temperature butterfly valve (100) of claim 8, with the valve shaft (121) and the actuator shaft (126) being correspondingly splined, wherein a hollow splined portion (129A) allows thermal expansion and contraction of the valve shaft (121) without affecting the coupling between the actuator shaft (126) and the valve shaft (121).

10. The high-temperature butterfly valve (100) of claim 8, with the valve shaft (121) including a hollow portion (129A) that receives at least a portion of the actuator shaft (126), wherein the hollow portion (129A) of the valve shaft (121) reduces a heat transfer from the valve shaft (121) to the actuator shaft (126).

11. The high-temperature butterfly valve (100) of claim 8, with the valve assembly (110) comprising:
   a valve body (103) including a valve bore (109) passing through the valve body (103), and a shaft bore (112);

the valve shaft (121) located in the shaft bore (112) and extending substantially across the valve bore (109); and a valve flap (107) affixed to the valve shaft (121) and configured to be rotated by the valve shaft (121), with the valve flap (107) being configured to rotate between a closed orientation blocking the valve bore (109) and an open orientation, with the valve flap (107) being affixed on an upstream valve bore portion side of the valve shaft (121) and offset from a center of the valve shaft (121), wherein incoming fluid presses the valve flap (107) against the valve shaft (121).

12. The high-temperature butterfly valve (100) of claim 8, with the fluid cooling system (225) comprising a substantially liquid cooling system (225).

13. The high-temperature butterfly valve (100) of claim 8, with the fluid cooling system (225) comprising a substantially gas cooling system (225).

14. A high-temperature butterfly valve (100), comprising:
a valve assembly (110);
a valve actuator (123) configured to couple to the valve assembly (110), with the valve actuator (123) including an actuator shaft (126) configured to couple to a valve shaft (121) of the valve assembly (110);
a thermal conductor ring (156) positioned between and contacted by the valve assembly (110) and by the valve actuator (123), wherein the thermal conductor ring (156) conducts heat from the valve assembly (110) to the valve actuator (123); and
a hollow portion (129A) formed in the valve shaft (121) and configured to receive at least a portion of the actuator shaft (126), wherein the hollow portion (129A) of the valve shaft (121) reduces a heat transfer from the valve shaft (121) to the actuator shaft (126), with the valve shaft (121) and the actuator shaft (126) being correspondingly splined, wherein the hollow splined portion (129A) allows thermal expansion and contraction of the valve shaft (121) without affecting the coupling between the actuator shaft (126) and the valve shaft (121); and
a fluid cooling system (225) configured to flow a cooling fluid through at least a portion of the valve actuator (123).

15. The high-temperature butterfly valve (100) of claim 14, with the valve (100) including a thermal conductor ring (156) positioned between and contacted by the valve shaft (121) of the valve assembly (110) and by an actuator inner mating portion (182) of the valve actuator (123), wherein the thermal conductor ring (156) conducts heat from the valve shaft (121) to the actuator inner mating portion (182) and wherein the actuator inner mating portion (182) of the valve actuator (123) is in communication with the fluid cooling system (225).

16. The high-temperature butterfly valve (100) of claim 14, with the valve (100) including a thermal insulator gasket (157) positioned between and contacted by the valve assembly (110) and the valve actuator (123), wherein the thermal insulator gasket (157) blocks heat transfer from the valve assembly (110) to the valve actuator (123).

17. The high-temperature butterfly valve (100) of claim 14, with the valve (100) including a thermal insulator gasket (157) positioned between and contacted by a valve outer mating portion (174) of the valve assembly (110) and an actuator outer mating portion (184) of the valve actuator (123), wherein the thermal insulator gasket (157) substantially blocks heat transfer from the valve outer mating portion (174) of the valve assembly (110) to the valve actuator (123) and allows heat transfer from the valve outer mating portion (174) to the actuator inner mating portion (182) via the thermal conductor ring (156).

18. The high-temperature butterfly valve (100) of claim 14, with the valve assembly (110) comprising:
a valve body (103) including a valve bore (109) passing through the valve body (103), and a shaft bore (112);
the valve shaft (121) located in the shaft bore (112) and extending substantially across the valve bore (109); and
a valve flap (107) affixed to the valve shaft (121) and configured to be rotated by the valve shaft (121), with the valve flap (107) being configured to rotate between a closed orientation blocking the valve bore (109) and an open orientation, with the valve flap (107) being affixed on an upstream valve bore portion side of the valve shaft (121) and offset from a center of the valve shaft (121), wherein incoming fluid presses the valve flap (107) against the valve shaft (121).

19. The high-temperature butterfly valve (100) of claim 14, with the fluid cooling system (225) comprising a substantially liquid cooling system (225).

20. The high-temperature butterfly valve (100) of claim 14, with the fluid cooling system (225) comprising a substantially gas cooling system (225).

* * * * *